Figure 1:
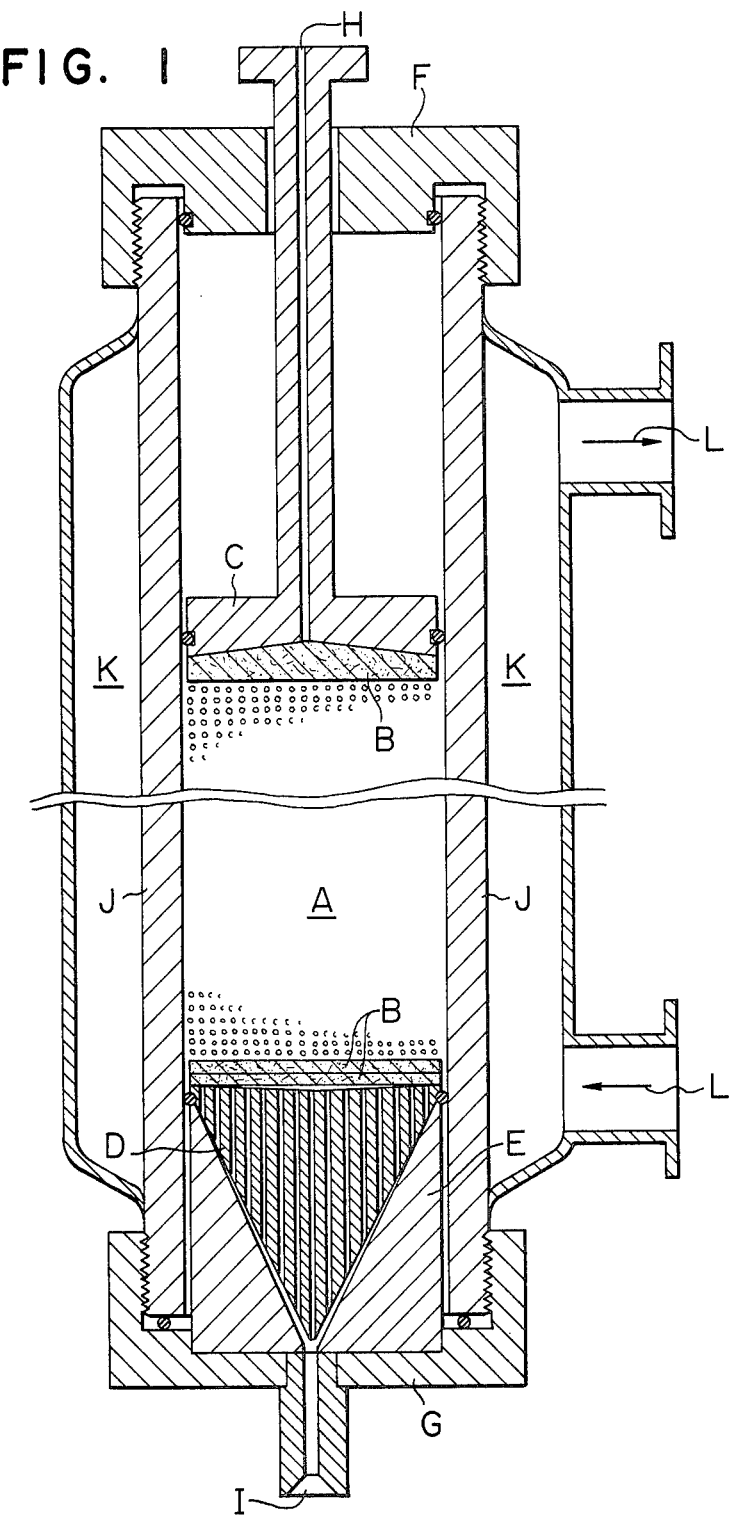

United States Patent [19]

Miyake et al.

[11] 4,092,398
[45] May 30, 1978

[54] ION EXCHANGE APPARATUS FOR URANIUM TECHNOLOGY

[75] Inventors: Tetsuya Miyake; Maomi Seko, both of Tokyo; Kunihiko Takeda, Yokohama; Akihiko Ikeda, Yokohama; Kazuo Imamura, Yokohama, all of Japan

[73] Assignee: Asahi Kasei Kogyo Kabushiki Kaisha, Osaka, Japan

[21] Appl. No.: 687,843

[22] Filed: May 19, 1976

[30] Foreign Application Priority Data

Jun. 6, 1975 Japan .................................. 50-67679

[51] Int. Cl.² .............................................. B01D 59/30
[52] U.S. Cl. .................................. 423/7; 252/301.1 R
[58] Field of Search .............................. 423/7, 2, 6; 252/301.1 R; 210/31 C

[56] References Cited

U.S. PATENT DOCUMENTS

| 3,953,568 | 4/1976 | Seko et al. | 423/7 |
| 3,953,569 | 4/1976 | Seko et al. | 423/7 |

FOREIGN PATENT DOCUMENTS 2,349,595  4/1974  Germany.

OTHER PUBLICATIONS

Spedding, F. H., "Macroseparation of Stable Isotopes on Ion-Exchange Columns", J. de Chimie Phys., vol. 60, pp. 89-96, 1963.
Spedding, F. H. et al., "A Laboratory Method for Separating Nitrogen Isotopes by Ion Exchange", J. Amer. Chem. Soc., vol. 77, pp. 6125-6132, 1955.
Kakihana, H., "A Fundamental Study on the Ion Exchange Separation of Lithium, Nitrogen and Uranium Isotopes", J. de Chimie Phys., vol. 60, pp. 81-88, 1963.

Primary Examiner—Benjamin R. Padgett
Assistant Examiner—Deborah L. Kyle
Attorney, Agent, or Firm—Burgess, Dinklage & Sprung

[57] ABSTRACT

An anion exchange column, containing anion exchange resin particles with uniform degree of sphericity, restricted average diameter and uniform particle size distribution and having devices for flowing a liquid uniformly, is suitably used for uranium technology, especially for separation of uranium isotopes.

4 Claims, 2 Drawing Figures

ION EXCHANGE APPARATUS FOR URANIUM TECHNOLOGY

This invention relates to an improved anion exchange column and arrangement thereof which are particularly suitable for uranium technology. The invention further relates to a process for separation of uranium isotopes by use of said column or arrangement.

Various processes and technologies have hitherto been made for chemically treating a uranium solution with an anion exchanger in uranium industry. Typical fields are (1) recovery of uranyl ion with anion exchanger from uranium solution in uranium refining industry and (2) separation of uranium isotopes with anion exchanger.

Known techniques of uranium recovery are described in "Technology of Uranium" written by N. P. Galkin et al., published by Israel Program for Scientific Translation in 1966 (Chapter 6). A basic process for separation of uranium isotopes with anion exchanger is also disclosed in German Published Specification DOS N. 2349595. In these known techniques and processes, however, no particular attention has been paid for physical construction of an ion exchange column containing ion exchange resins and equipment used therefor.

It has now been found that the physical construction of an ion exchange column and equipment used therefor critically affect the efficiency of a process in uranium technology, especially in separation of uranium isotopes.

An object of the present invention is to provide a novel ion exchange column suitable for use in uranium technology such as separation of uranium isotopes.

Another object of the present invention is to provide an arrangement of ion exchange column having plural ion exchange columns of the invention combined in a specific manner which is particularly suitable for continuous operation for separating uranium isotopes.

Still another object of the present invention is to provide a process for separation of uranium isotopes by use of said column or arrangement as mentioned above and to provide a method for separation of uranium isotopes by a special moving pattern of uranium solution in said arrangement.

Other objects will be apparent from the descriptions detailed below.

In the accompanying drawings

Figure 2:
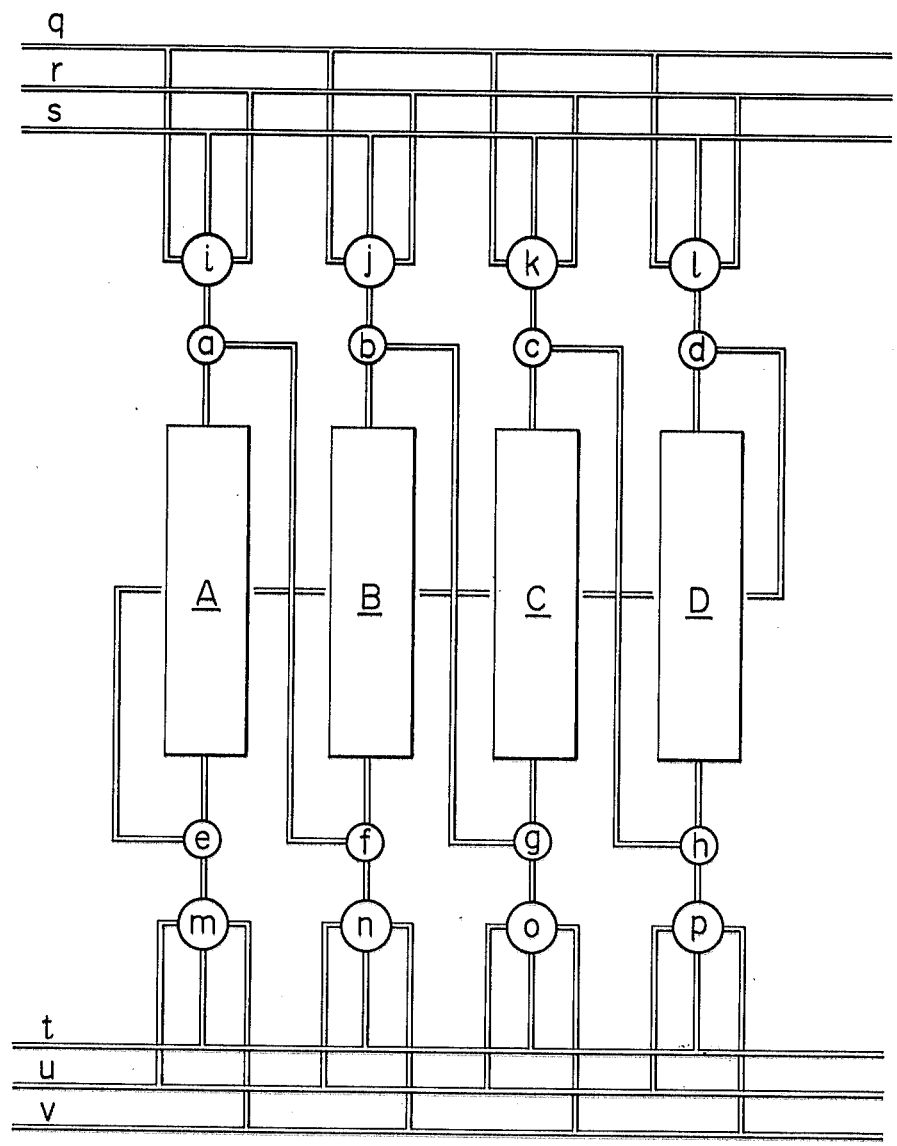

FIG. 1 shows a cross-sectional view of one example of an ion exchange column according to a preferred embodiment of the invention; and FIG. 2 shows a schematic flow diagram having plural ion exchange columns connected for use in a process for separation of uranium isotopes.

In one aspect, the present invention deals with physical structures of ion exchange resin particles which are constituent elements of the ion exchange resin column of the invention. In particular, the invention is based on the discovery that the degree of sphericity of each resin particle, the average diameter of each resin particle and the diameter distribution of the whole resin particles as herein specified have specific effect in applications for uranium technology such as separation of uranium isotopes. In another aspect, the present invention proposes to use specific devices to be equipped for the ion exchange column of the invention. In further aspect of the invention, it deals with a specific connection between the plural ion exchange columns which is suitable for construction of an arrangement to be applied for continuous operation.

The ion exchange column provided by the present invention is specific in the ion exchange resin particles contained therein which are uniform in degree of sphericity, average particle size and particle size distribution represented by uniformity constant as specified by the following relations;

(A) 20 microns $\leq \bar{\phi} \leq$ 200 microns;
(B) Uniformity Constant $\leq$ 1.7
(C) $1 \leq \alpha/\beta \leq 2$ for at least 90% of ion exchange particles in the column, wherein $\bar{\phi}$ is the average diameter of the whole ion exchange resin particles; Uniformity Constant is as defined below; $\alpha$ and $\beta$ are the longest axis and the shortest axis of each ion exchange resin particle, respectively. Furthermore, the column of the invention is provided desirably with a distributor of liquid and more desirably with a moving plug. According to a preferred embodiment of the invention wherein two or more columns are combined, the columns are connected by means of coupling pipes with a limited volume relative to that of the ion exchange columns.

One of the specific features of the ion exchange resin particles to be used in the present invention is the degree of sphericity of each particle. Ion exchange resin particles are generally shaped in globular forms. Strictly speaking, however, most of them are shaped as irregular ellipsoids rather than as regular spheres. Hence, the term "degree of sphericity" refers to the ratio of the longest axis to the shortest axis in the ellipsoidal body of each particle. It has been found in the present invention that a good degree of sphericity makes the rate of adsorption on and desorption from anion exchange resin particle of uranium ions uniform thereby to make liquid flow pattern through the column uniform. The degree of sphericity is therefore required to be from 1 to 2 for at least 90% of the particles to be used in the ion exchange column of the invention.

The average diameter of the ion exchange particle is also an important factor in the invention. In general, the rate of adsorption-desorption of uranium ions is increased as the average diameter is smaller. However, disturbance of a liquid flow pattern through the column is observed to occur if the average diameter is too small or too large. Accordingly, the average diameter of the ion exchange resin particles in the column of the invention is required to be from 20 to 200 microns.

Furthermore, the difference in particle diameter among the ion exchange resin particles is found to cause the difference in the rate of adsorption-desorption of uranium ions. From this standpoint, the ion exchange resin particles to be used in the present invention should have a narrow distribution in particle diameters. Namely, it is critical that uniformity constant which indicates particle size distribution should be less than 1.7.

Referring now to FIG. 1 which shows a cross-sectional view of one example of an ion exchange column according to a preferred embodiment of the invention, A is the resin bed containing the ion exchange resin particles as described above. The resin bed A is sandwiched in between the filter-type liquid distributors at top and bottom of the resin bed. The column in FIG. 1 consists of a tubular wall J and caps F and G at top and bottom, respectively, and has inlet H and outlet I at top and bottom, respectively. The column is mantled with a jacket K, through which heat transfer medium L can be passed for heating the column. Under the lower filter-type distributor B is further provided a multipore-type distributor D which is placed on a support E. The moving plug C is placed on the upper filter-type distributor B to keep the resin particles packed tightly in the column. The moving plug C is slidably mounted inside of the wall J and can move freely as the resin bed is expanded by swelling or reduced by shrinkage. By means of the moving plug C, the resin bed can be held constantly under a compactly packed state even when there is a change in volume in the resin bed due to swelling or shrinkage, as caused by use of different solutions through the resin bed.

A column, having a diameter from about 10 cm to about 8 m, is often used, and the column wall, distributor, cap, and moving plug can be made of glass, plastics, steel, stainless steel, rubber lining or other materials.

Referring to FIG. 2, which shows one example of a schematic flow diagram having plural ion exchange columns connected for use in a process for separation of uranium isotopes, A, B, C and D are ion exchange columns described above. Four columns are connected with valves $a$, $b$, $c$, $d$, $e$, $f$, $g$ and $h$ and with pipes between those valves. Solutions such as of uranium, desorbent, oxidizing agent and reducing agent are fed to and taken out from the columns through the pipes $q$, $r$, $s$, $t$, $u$ and $v$ and valves $i$, $j$, $k$, $l$, $m$, $n$, $o$ and $p$.

Although a system having more than two columns and more than four rotary valves can be used in this invention, a system having from three to about twenty-four columns is more desirable for the sake of the column efficiency, i.e. the optimum proportion of the number of the whole columns relative to that of the working columns.

As mentioned above, the ion exchange column of the invention has desirably a distributor for liquid which permits a solution to flow uniformly through the bed of ion exchange particles. Any type of distributor can be available for this purpose, so long as it can divide a liquid flow into innumerable branch streams. For example, branch-type, net-type, filter-type, taper-type, combination-type, etc. can be used. The distributor is provided on the resin bed at one of the ends through which a solution enters into the bed. Another distributor is also provided at the other end of the resin bed to make liquid flow through the bed uniform.

The volume of the ion exchange resin bed is changed in volume as it contacts different kinds of solutions due to swelling or shrinkage of the resin particles contained therein. Accordingly, an extra space has been necessary to allow expansion of the resin bed. However, such a space is liable to cause disturbance of liquid flow pattern. When a moving plug as described above is provided in the column, it can move freely as the bed is expanded or reduced while holding the bed under tightly packed state, whereby there is required no extra space for allowance of expansion of the bed.

Another important point for high efficiency of ion exchange is that the diameter of coupling pipe for connection of columns is as slender as possible. Based on experiments, the total volumes of the whole coupling pipes (volume of each coupling pipe refers to that from outlet of one column to inlet of another) is found desirable to be not more than 8% of the total volume of the columns, and it is more desirable that the volume of pipes is not more than 1% of the volume of the columns. The coupling pipes should preferably have diameters which are substantially the same, but may sometimes differ from each other, if desired. The inventors of this invention have experienced that coupling pipes, the total volume of which is 0.3% of the column volumes, can be very effective.

The volume in the other equipment such as valves is equal to the volume of the coupling pipes.

For preparation of the anion exchange resin particles to be used in the present invention, conventional methods can be employed. However, in order for the anion exchange resin particles to satisfy the specific requirements of the invention, there should be taken particular cares as to selection of polymerization method, equipments therefor, as well as polymerization conditions. From this standpoint, it has been found that continuous suspension polymerization is suitable as polymerization method for preparation of the anion exchange resin particles of the invention. A cylindrical vessel with a volume in the range from 5 liters to 100 $m^3$ is suitably used as polymerization reactor. Such a reactor is preferably equipped with other means such as agitating wings or baffle. The reaction conditions such as temperature, monomer concentration or stirring speed should carefully be selected, depending on the desired product of the anion exchange resin particles to be obtained. In suspension polymerization, selection of suspension agents is also important. When monomers used are oily in nature, it is preferable to use viscous materials as suspension agents, including gum arabic, gamboge, rosin, pectin, alginic acid and salts thereof, gum tragacanth, Japanese isinglass, methyl cellulose, starch, carboxymethyl cellulose, karaya gum, gelatin, synthetic polymers such as sodium polyacrylate, polyvinyl alcohol, polyvinyl pyrrolidone, inorganic substances such as magnesium aluminum silicate, permagel, hydrated magnesium silicate, titanium oxide, zinc oxide, calcium carbonate, talc, barium sulfate, calcium phosphate, aluminum hydroxide, silicic acid anhydride, and the like. When the monomer used dissolves in water, synthetic polymers and surface active agents such as sorbitan esters, sorbitan ester ethers, fatty acid soaps and fatty acid glycerides are desirable as suspension agents.

When the resin particles have a particle size distribution beyond the range as specified above, fractionation of the resin particles is necessary for selection of the resin particles with a narrower size distribution. Generally speaking, resin particles having ion exchange groups can hardly be fractionated because they are hydgroscopic in nature and very brittle on drying for fractionation. Accordingly, it is preferred to perform fractionation before introduction of ion exchange groups into the resin particles. Such a device as cyclone, centrifugal dehydrator or sieve can be used for fractionation. In cases when the anion exchange resin particles have ion exchange groups, a device such as vibration sieve or flow column is suitably used for fractionation. A continuous fractionation method as disclosed in Japanese Patent Publication No. 122,396/74 is most preferably applied for the present invention.

In the present invention, measurements of average particle size, particle size distribution and degree of sphericity as mentioned above are performed by the following methods.

I. MEASUREMENT OF AVERAGE PARTICLE SIZE

Average particle size used in this invention is volume average size on a number basis and it is measured with microscope. Although many methods of measurement of average particle size with microscope are known, the method described by Fairs, G.L. in "Developments in the Technique of Particle-Size Analysis by Microscopic Examinations" J. Roy. Microscope Soc. volume 71, p. 209-222 (1951) is used in this invention. The particles are suspended in 2N HCl at 25° C.

II. MEASUREMENT OF PARTICLE SIZE DISTRIBUTION

Particle size distribution in this invention is represented by uniformity constant which is defined in Equation below.

Uniformity Constant (UC) = $D_{60}/D_{10}$ wherein $D_{60}$ is the diameter of the particle corresponding to the value on a diameter-volume distribution curve where the integrated volume from the smallest diameter to said value is 60% of the total volume of the whole particles.

Likewise, $D_{10}$ is the diameter corresponding to 10% integrated volume.

III. MEASUREMENT OF THE DEGREE OF SPHERICITY

The longest axis of each ion exchange resin particle and the shortest axis of each ion exchange resin particle are measured with microscope at the same time as when average particle size is measured.

The three physical parameters discussed above can be measured at the same time, so it is easy to determine whether the resins can be used in this invention or not.

Examples of anion exchangers useable in the process of the present invention are strongly basic anion exchange resins having quaternary ammonium groups prepared by chloromethylating styrene-divinylbenzene copolymers, followed by amination; weakly basic anion exchange resins having primary or tertiary amine groups. When these ion exchangers are employed in the present process, it is desirable that they should have preferred adsorption power for uranyl ion, and adsorption and desorption should be effected rapidly.

Among these compounds, any anion exchangers which have preferential adsorption power for uranyl ion over uranous ion, low degree of swelling and shrinking in contact with various solution such as uranium solution, and effect adsorption and desorption rapidly enough to operate smoothly can be employed in the present invention.

From this standpoint, the resins which are on the market are often unsuitable for this process and a resin which satisfies the above requirement should be selected by experiments. For example, there should be paid due considerations as to the chemical structure such as styrene-divinylbenzene structure, heterocyclic monomer structure, and grafted structure, the kind of ion exchange groups such as quarternary ammonium groups and tertiary amine groups and the physical structure such as the degree of porosity. The most suitable resin should be selected corresponding to the condition of solution, temperature and other operation conditions.

The most desirable anion exchange resin is particle with a size of 1 mm or less in diameter comprising a three-dimensionally crosslinked polymer containing functional groups having anion exchange capacity of 0.2 milliequivalents or more per gram of dry resin and having a mass transfer coefficient of uranyl ion of at least $1 \times 10^{-7}$ cm/sec. and wherein the particle contains discrete micro-voids having sizes in the range from 40 to 9000 angstroms, more desirably from 60 to 3000 angstroms. The details of such an anion exchange resin are described in the co-pending application Ser. No. 687,844 filed on even date herewith. The subject matter of said application is herein incorporated by reference.

The ion exchange column of the present invention can suitably be used for uranium technology, especially for seperation of uranium isotopes. Separation of uranium isotopes can effectively be conducted by chromatography through the anion exchange resin particles of the present invention. The basic process for separation of uranium isotopes by use of anion exchange material is disclosed in German Published Specification DOS No. 2349595. Generally speaking, the ion exchange column of the present invention is applicable for a process for separation of uranium isotopes which comprises moving at least one redox boundary formed between an adsorption zone of uranium isotope mixture and a reducing agent or an oxidizing agent through the anion exchange resin particles while conducting redox reaction at said boundary thereby to concentrate at least one isotope in the region near said boundary.

According to one embodiment of said process (mode A), a uranium isotope solution containing U(VI) compounds is first fed to an anion exchange column of the present invention and then a reducing agent solution is fed to the column to reduce the uranium (VI) ions adsorbed on the resins to be eluted in the form of uranium (IV) ions. A boundary is thereby formed (hereinafter referred to as "reduction boundary") between the uranium adsorption zone and the reducing agent and displaced in the direction of the flow of the eluant (i.e. reducing agent solution). A solution of reduced uranium ion is recovered as effluent from the end of the column and the uranium solution recovered from the vicinity of the reduction boundary is concentrated in uranium-235.

As a modification of the mode A (mode B), a solution of oxidizing agent is fed to the column, followed by feeding of a uranium isotope solution containing U(IV) compounds and then feeding of a reducing agent solution. In addition to the reduction boundary, another boundary is thereby formed (hereinafter referred to as "oxidation boundary") between the oxidizing agent and the uranium adsorption zone forwardly in the direction of eluant flow. The uranium solution recovered from the vicinity of the oxidation boundary is depleted in uranium-235 and that from the vicinity of the reduction boundary is concentrated in uranium-235. If the step of feeding a reducing agent solution is omitted in the mode B (mode C), only a uranium solution depleted in uranium-235 is recovered from the vicinity of the oxidation boundary.

When continuous separation is carried out by use of an arrangement having plural columns as described above, the operation can be continued by any of the above embodiments until a desired concentration is obtained.

This invention also provides a method for separation of uranium isotopes by a special moving pattern of uranium solution which flows from a column to another column. In the above processes (modes A, B and C), a certain distribution of abundance ratios of uranium-235 is formed in a column along the direction of a displacement flow when the operation is continued until the abundant ratio of uranium-235 from the vicinity of boundary reaches a desired vaue.

In prior art, uranium solution remaining partly separated in a column at that time is recovered. But a uranium solution which has once undergone separation but has not yet reached a desired abundance ratio of uranium-235 is desirably recycled to a next column instead of being recovered, because remixing of uranium isotopes once separated occurs by such recovery. Therefore, it is indispensable for efficient continuous operation to move the uranium solution from a column to a next column through coupling pipes without changing the distribution pattern of the once separated uranium solution as mentioned above. This operation is called special moving pattern of uranium solution. This moving pattern is important because the uranium solution which has separated to a certain abundance ratio but has not separated to a desired ratio should be used in a next stage of development. The productivity of uranium separation is improved greatly in the process of this invention where the whole uranium solution is not recovered, as compared with the known method where the whole uranium solution is recovered at each stage of operation; the productivity can be increased by from about 8 times to about 24 times that of prior art.

There are two modes in the continuous operation of this invention. According to the one embodiment of said continuous operation (mode D), a uranium solution which has been separated to a certain abundance ratio but has not been separated to a desired ratio is recycled to a next column without being taken out and a uranium solution which has been separated to a desired ratio is recovered.

As another operation (mode E), in addition to the operation of mode D, a feed uranium solution to be separated is further added to the uranium solution which is recycled.

The operation of mode E in a steady state is explained below by referring to FIG. 2.

In a steady state, the uranium zone moves from column to column while being oxidized at the oxidation boundary between the region of oxidizing agent and uranium zone and being reduced at the reduction boundary between uranium zone and the region of reducing agent. The oxidizing agent is fed to a column previous to the development of the uranium zone and the reducing agent is fed to a column after the uranium zone.

Now, the uranium zone is in column B and C, the oxidizing agent is in column A and the reducing agent is in column D. The uranium zone is moved to column A through the line (f–a) by the reducing agent which is fed to column C through the line (q–k–c). When the oxidation boundary of the uranium zone reaches (e) and the abundance ratio of uranium solution is at a desired value, the uranium solution from the vicinity of the boundary is recovered. Then, a next eluant part of uranium zone is fed to column D through coupling pipes (e-d) without being taken out from columns. When the center part of the uranium adsorption zone reaches (e), a feed uranium solution tobe separated is added thereto through the line (r–l14 d). Then, a next eluant part of uranium zone is fed to column D again until the reduction boundary of the uranium zone reaches the bottom of column A. The uranium solution from the vicinity of the reduction boundary is recovered from the bottom of column A. By repeating the above operation, the uranium zone is recycled from column to column and uranium solution from the vicinity of boundaries is recovered and feed uranium solution to be separated is added to columns continuously.

The most important point in the above operation is that the recovered uranium solution, the abundance ratio of which is a desired value, is not the whole uranium solution in the uranium zone but is part of the uranium solution and that the remainder is recycled to a next column through slender coupling pipes without being taken out from the columns.

EXAMPLE 1

Various anion exchange resin particles are prepared according to the methods as described below.

Preparation A

An aqueous solution is prepared by dissolving under agitation 51 g of methyl cellulose, 110 g of calcium phosphate, 11 g of dodecylbenzene sulfonate and 41 g of sodium chloride in 20 Kg of water in a four-necked, 40 liter flask. Then, in this solution is suspended in fine droplets under stirring a mixture comprising 140 g of ethylvinylbenzene and 166 g of 4-vinylpyridine as monomers, 200 g of divinylbenzene as cross-linking agent, 1000 g of benzylalcohol and 1500 g of dibutylphthalate as mixed diluent and 20 g of azobisisobutyronitrile as radical initiator. The polymerization is conducted at 70° C for 60 hours. The polymerized product is cooled and transferred to a washing tower equipped with a filter, wherein the resin particles obtained are washed fully with 10 liters of methanol and 100 liters of water. The washed resin is fed to a fractionator to be fractionated. The ion exchange capacity of the thus prepared resin is found to be 5.45 meq./g ($Cl^-$ form). This esin is identified as "001".

Preparation B

To a 40 liter for necked flask equipped with three wing agitator, wedge type baffle and reflux condenser, 20 Kg of water, 30 g of methylcellulose, 20 g of sodium laurylsulfate, 210 g of calcium phosphate, 80 g of sodium chloride and 320 g of sodium pyrophosphate are fed under agitation, keeping the flask at 60° C. Then, 120 g of styrene, 140 g of ethylvinylbenzene, 200 g of divinylbenzene, 1540 g of 2-methyl-5-vinylpyridine, 32 g of azobisisobutyronitile, 1000 g of dibutylphthalate and 800 g of diethylphthalate are fed to the mixture, and are agitated for 15 minutes at 250 rpm, followed by slow-down of the rotation rate to 80 rpm. At the same time, the temperature is set at 75° C and changed to 70° C after 15 minutes. They are polymerized for 22 hours in this state, cooled after polymerization and recovered, followed by washing in a washing vessel. This resin is measured in 0.1N HCl and the ion exchange capacity is 5.08 meq./g. ($Cl^-$ form). The resin is numbered as "002".

Preparation C

An aqueous solution is prepared by dissolving under agitation 1.2 g of hydroxypropylmethylcellulose (21% methoxy radical, 8% hydroxypropyl radical, viscosity is 100 at 2% solution, average molecular weight is 26,000), 10,000 g of 10% suspension in water of calcium phosphate, 100 g of sodium chloride, 13 g of lauroyl peroxide, 1334 g of styrene, 150 g of ethylvinylbenzene, 183 g of divinylbenzene, 1334 g of methylbenzoate and 384 g of n-butanol in 20 Kg of water in a four-necked, 40 liter flask. The polymerization is conducted at 80° C for 40 hours. The polymerized product is cooled and transferred to a washing tower equipped with a filter, wherein the resin particles obtained are washed fully with 10 liters of ethanol and 100 liters of water, followed by drying at 40° C for 50 hours under reduced pressure of 10 mmHg. The dried resin (1550 g) is fed to a 2 liter reactor and is allowed to react with one liter of chloromethylether and 2500 g of zinc chloride at 5° C for 48 hours and then aminated with 15% aqueous dimethylamine solution. The ion exchange capacity of the thus prepared resin is found to be 4.45 meq./g (CL⁻). This resin is numbered as "003".

Preparation D (For comparative purpose)

To a 40 liter, for necked flask, equipped with an agitator, a thermometer and a reflux condenser, a solution of 30 g of hydroxypropylmethylcellulose dissolved in 30 Kg of water and 100 g of sodium chloride are fed, followed by feeding of a mixture of 8000 g of styrene, 900 g of ethylvinylbenzene, 1100 g of divinylbenzene, 8000 g of methylbenzoate and 2100 g of n-butanol containing 120 g of lauroylperoxide dissolved therein is fed. Oily particles are formed under agitation at 65 rpm and the mixture is polymerized for 28 hours at 70° C. After polymerization, the product is washed with methylalcohol and water, dried, then chloromethylated with chloromethylether and tin chloride, and further aminated with 30% diethylamine-ethanol solution. The ion exchange capacity of this resin is 4.15 meq./g (Cl⁻ form). This resin is numbered as "101".

Preparation E (For comparative purpose)

Preparation B is repeated, but 2300 g of methyldichloroebenzene is used in place of dibutylphthalate and diethylphthalate. The ion exchange capacity of this resin is found to be 5.23 meq./g (Cl⁻ form). This resin is numbered as "102".

Preparation F (For comparative purpose)

Preparation A is repeated, but 40 g of methylcellulose in place of 51 g of methylcellulose, calcium phoshate and dodecylbenzene suflonate is used and the resin particles after washing are not fractionated. The ion exchange capacity of thus prepared resin is found to be 5.68 meq./g. (Cl⁻ form). This resin is numbered as "103".

To six cylindrical development columns ("column A") as shown in FIG. 1 (10 mm in diameter and 3000 mm in length) and one cylindrical column which has the same structure as column A except that it has no distributor, each resin prepared in Preparation A and F is packed. The columns are heated at 90° C, Solution I to IV as shown below are fed in this order to the development columns to carry out separation of uranium isotopes according to the mode B as mentioned above. Each effluent recovered in fractions from the top of the column is subjected to measurement of the concentration with mass spectrometer.

Solution I; 4N hydrochloric acid

Solution II; 0.05 M ferric chloride-4N hydrochloric acid

Solution III; 0.10 M uranyl and 1.0 M ferric chloride-4N hydrochloric acid

Solution IV; 0.20 M titanous chloride and 1.0 M ferrous chloride-4N hydrochloric acid The concentration ratio of uranium-235 in the feed uranium is 0.007250. The physical constructions of those resins and the abundance ratio of uranium-235 are shown in Table 1.

Table 1

| Exp. No. | Resin No. | D (microns) | UC | Ds | Column | Abundance ratio from O.B. | Abundance ratio from R.B. |
|---|---|---|---|---|---|---|---|
| 1 | 001 | 58 | 1.16 | 1.13 | A | 0.006816 | 0.007745 |
| 2 | 002 | 76 | 1.27 | 1.3 | A | 0.006900 | 0.007631 |
| 3 | 003 | 128 | 1.42 | 1.16 | A | 0.007018 | 0.007478 |
| 4 | 101 | 244 | 1.31 | 1.6 | A | 0.007217 | 0.007291 |

Table 1-continued

| Exp. No. | Resin No. | D (microns) | UC | Ds | Column | Abundance ratio from O.B. | Abundance ratio from R.B. |
|---|---|---|---|---|---|---|---|
| 5 | 102 | 128 | 1.19 | 2.3 | A | 0.007179 | 0.007301 |
| 6 | 103 | 75 | 1.92 | 1.2 | A | 0.007166 | 0.007315 |
| 7 | 001 | 58 | 1.16 | 1.13 | B | 0.007214 | 0.007298 |

D=average particle diameter,
UC=Uniformity Constant,
Ds=degree of sphericity,
O.B. =Oxidation Boundary,
R.B. =Reduction Boundary,

EXAMPLE 2

The columns, 20 mm in diameter and 1,200 mm in length, are combined as in FIG. 2, to prepare an arrangement for continuous separation. The total volumes of the whole coupling pipes is 2.3% of the total volumes of the whole columns. Columns A, B, C and D are packed with anion exchanger which satisfy the conditions of this invention as in Example 1. Solution-II as used in Example 1 is fed to column A, B, C and D through the line (i-a), (j-b), (k-c) and (l-d) from the line s. Then, Solution-III as used in Example 1 is fed to column A through the line (i-a) from the line r. The liquid which flows out from column A is moved to column D through the line (e-d), then moved to column C through the line (h-c) from the bottom of the column D, and is recovered from the bottom of column C through the line (g-o-t). Just before Solution-III reaches the bottom of column D, Solution-IV as used in Example 1 begins to be fed to the column through the line (i-a) from the line q. At the same time, the direction of liquid flow from the bottom of column C is changed to the line (g-b), and it is taken out from the bottom of column B through the line (f-n-t). When Solution-IV reaches d, the feed of Solution-IV is changed to the line (q-l-d), successively, Solution-II is fed to column A through the line (s-i-a) and the liquid is taken out from the column through the line (e-m-t).

When Solution-III reaches the bottom of the column B, the liquid from the bottom of column B is moved to column A through the line (f-a). At the same time. Solution-IV is fed to column C through the line (q-k-c), Solution-II is fed to column D through the line (s-l-d) and the liquid flowing from the column is recovered through the line (h-p-t).

The flow of Solution-III is recycled in the arrangement in the order of column A - column D - column C - column B - column A - column D as mentioned above. The liquid mainly consisting of Solution-II and Solution-III is recovered from the bottom of the column, and the liquid mainly consisting of Solution-III and Solution-IV is also recovered from the bottom of the column. Solution-III, in which the amount of uranium ion included is the same as that of uranium ion which is taken out from the column, is fed to the center of the adsorbed region of Solution-III through the line (r-i-a).

In said continuous operation, the separated material is recovered from the bottom of column A and Solution-III is fed to the top of column A.

Table 2

| | |
|---|---|
| Abundance ratio of feed uranium | 0.007250 |
| Abundance ratio of recovered uranium (1)* | 0.008421 |
| Abundance ratio of recovered uranium (2)** | 0.005997 |

Table 2-continued

| Productivity of recovered uranium (1)* | 2.31 g/day |
|---|---|

*1; Recovered uranium (1) is in the liquid mainly constituted with Solution-II and Solution-III.
**2; Recovered uranium (2) is in the liquid mainly constituted with Solution-III and Solution-IV.

What we claim is:

1. In a process for separation of uranium isotopes, which comprises displacing at least one redox boundary formed between an adsorption zone of a uranium isotope mixture and a reducing agent or an oxidizing agent through an anion exchange column while conducting a redox reaction at said boundary thereby to concentrate at least one isotope in the region near said boundary, the improvement comprising effecting the separation employing an anion exchange column containing a resin bed of anion exchange resin particles packed therein and having distributors for liquid provided at both ends of said resin bed, said anion exchange resin particles being uniform in degree of sphericity, average particle size and particle size distribution represented by Uniformity Constant $D_{60}/D_{10}$ as specified by the following relations:

(A) 20 microns $\leq \bar{\phi} \leq$ 200 microns;
(B) $D_{60}/D_{10} \leq 1.7$
(C) $1 \leq \alpha/\beta \leq 2$ for at least 90% of anion exchange particles, wherein $\bar{\phi}$ is the average diameter of the whole ion exchange resin particles; $D_{60}$ and $D_{10}$ are the diameters of the particles corresponding to the values on a diameter-volume distribution curve where the integrated volume from the smallest diameter to said values are 60% and 10%, respectively, of the total volume of the whole particles; and $\alpha$ and $\beta$ are the longest axis and the shortest axis of each anion exchange resin particle, respectively.

2. A process for continuous separation of uranium isotopes, which comprises displacing at least one redox boundary formed between an adsorption zone of uranium isotope mixture and a reducing agent or an oxidizing agent through a plurality of anion exchanger columns combined in series with coupling pipes, the total volume of the coupling pipes being not more than 1% of the total volume of the columns, thereby to concentrate at least one isotope in the region near said boundary to a desired abundant ratio.

3. A process for continuous separation of uranium isotopes as claimed in claim 2, wherein the isotope concentrated to a desired abundance ratio in taken out from one of the columns and the remainder of the isotope adsorption zone which has been partly separated but not yet reached a desired abundant ratio is transferred to another column without changing the state of distribution of the abundance ratios in the zone.

4. A process for continuous separation of unranium isotopes as claimed in claim 2, wherein additional feed of starting uranium isotope mixture is further added to the remainder of the isotope adsorption zone.

* * * * *